Sept. 11, 1928.
S. E. GRIFFITH
1,683,665
VEHICLE BRAKE
Filed April 19, 1926
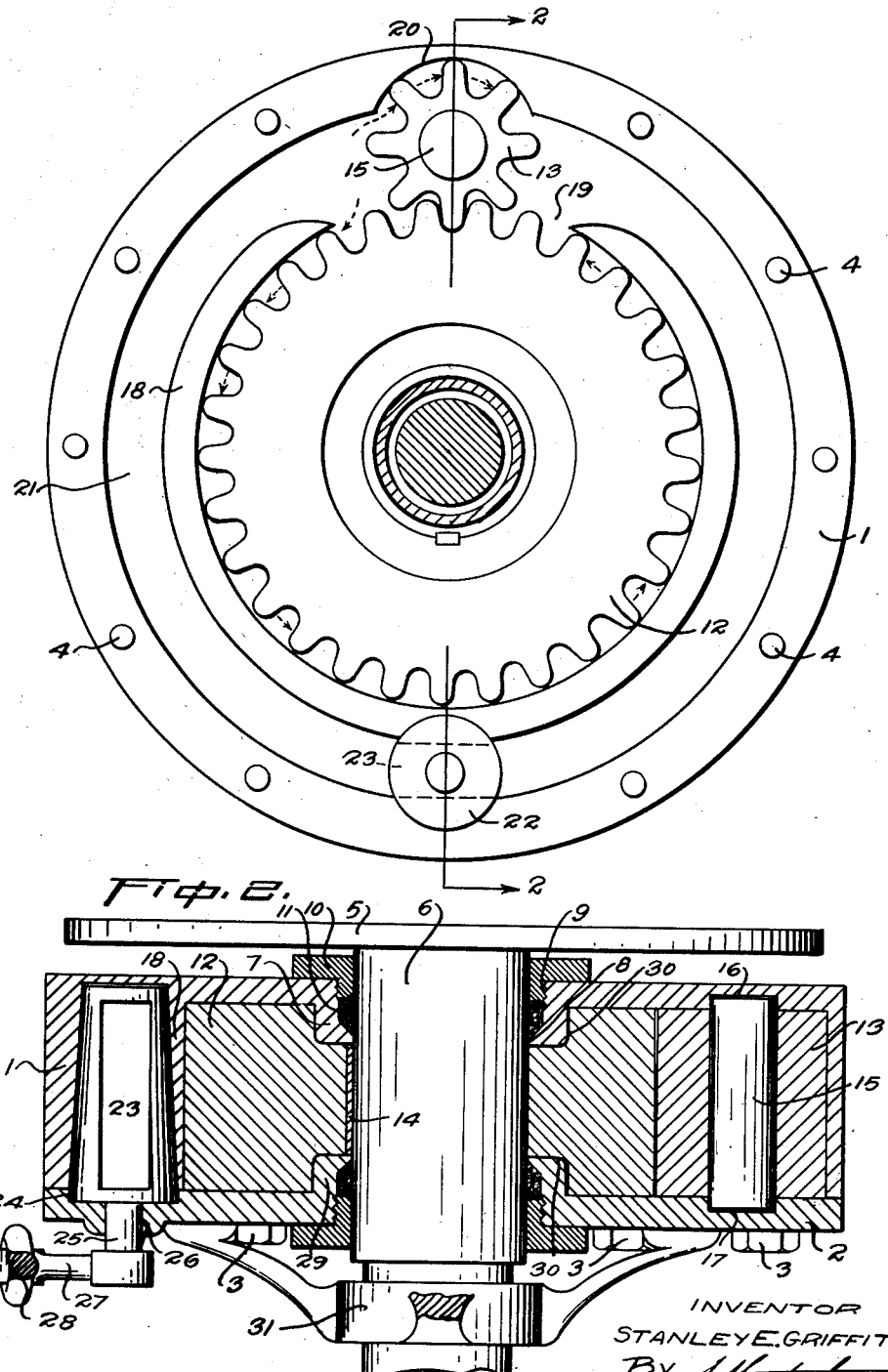
INVENTOR
STANLEY E. GRIFFITH Patented Sept. 11, 1928.

1,683,665

UNITED STATES PATENT OFFICE.

STANLEY EZEAKEL GRIFFITH, OF OLEAN, NEW YORK.

VEHICLE BRAKE.

Application filed April 19, 1926. Serial No. 103,122.

My invention relates to vehicle brakes and the object of the invention is to construct a braking device wherein liquid is constantly circulated when the brake is inoperative, means being provided for restricting the flow of liquid to actuate the braking mechanism. A further object of the invention is to devise a braking mechanism whereby the flow of liquid can be regulated to obtain any desired braking power. A still further and particular object of the invention is to devise a vehicle brake mechanism wherein frictional contact between moving and stationary surfaces is entirely eliminated thus obviating the frequent adjustments which are required upon frictional brakes. Another object of the invention is to so construct my device that it can be readily substituted on any automobile in lieu of the usual type of band brake mechanism now employed.

My invention consists of a vehicle brake constructed and arranged all as hereinafter more particularly described and illustrated in the accompanying drawing in which:

Fig. 1 is a side elevational view of my device, the cover plate being removed, and, Fig. 2 is a cross sectional view taken through the line 2—2 Figure 1, the entire mechanism being shown in its assembled position.

Like characters of reference indicate corresponding parts in the different views.

My device is preferably housed in a drum shaped casing 1 provided with a circular cover plate 2 of the same diameter which is adapted to be seated upon the open side of the casing, being held in relation thereto by a plurality of nuts 3 threaded upon studs 4 which extend outwardly from the casing 1, the studs 4 passing through similarly positioned orifices in the cover plate 2, the nuts 3 being then threaded thereon and tightened down in the usual manner.

When it is desired to substitute my device for the band brake mechanism on an automobile such mechanism is removed from the back axle and the brake drum removed from the wheel. I provide a circular plate 5 of approximately the same diameter as the discarded brake drum and adapted to be positioned upon the wheel in lieu thereof, being secured thereto by the means employed to secure the brake drum. Upon the face of the plate 5 facing the inside of the car I provide a centrally positioned sleeve 6 which is adapted to extend over and rotate about the outer end of the axle housing. Before positioning the sleeve upon the axle housing I position thereon the brake mechanism which I will now describe.

Upon the inner side of the face of the casing 1 a centrally positioned circular boss 7 is formed being adapted to constitute a journal for the sleeve 6, such sleeve 6 passing through the central orifice 8 in the boss. Upon the outer side of the face of the casing 1 the orifice 8 is enlarged and internally threaded in its outer end 9, being adapted to receive the gland packing nut 10 and provided in its inner end with the usual gland packing 11.

A pair of intermeshing gears 12 and 13 are provided in the casing 1, the gear 12 being positioned upon the sleeve 6 which extends through the casing, and secured thereto by any suitable means such as a feather 14. The gear 13 is rotatably mounted upon a spindle 15 positioned in parallel relation to the sleeve 6 and extending between the inner side of the casing 1 and the inner side of the cover plate 2, the ends of such spindle extending into the recessed bearings 16 and 17 in the before mentioned inner sides. Extending outwardly from the inner face of the casing 1 and surrounding the gear 12 a circular wall 18 is furnished, such wall being so positioned to just give a clearance for the tip of the teeth on the gear 12 as such gear revolves. Where the gear 12 meshes with the gear 13 a gap 19 in the wall is constituted. Upon the inner peripheral face of the casing 1 a segmental portion 20 is cut away, such cut away portion being adapted to receive the gear 13, its face just allowing clearance for the tips of the gear teeth. Upon reference to the drawing it will be seen that a circular passageway 21 is constituted between the inner peripheral face of the casing 1 and the outer face of the wall 18, such passage being closed by the gear 13 meshing with the gear 12.

Diametrically opposite the gear 13 in the passage 21 a tapered rotatable valve 22 is positioned and provided with a diametrical orifice 23 passing therethrough, such valve being seated between the wall 18 and the inner peripheral face of the casing 1 and constituting a means for controlling a flow of liquid around the passage 21. The large end of the valve which is adapted to seat in a circular recess 24 in the cover plate 2 has a centrally positioned valve stem 25 extending therefrom and projecting through an orifice 26 in the cover plate, the outer end of such valve stem being furnished with an arm 27 which is suitably connected to a valve actuating rod 28. Where the sleeve 6 passes through the center of the cover plate 2 a gland assembly similar to the gland assembly before described is also furnished, a central boss 29 being formed upon the inner face of the cover plate. Upon reference to Figure 2 of the drawing it will be seen that the gear 12 is provided at its center in both faces with circular recesses 30 into which the bosses 7 and 29 project when the device is assembled, it will also be seen that the gears 12 and 13 are of sufficient width to extend right across the casing assembly, a clearance of several thousandths of an inch between the faces of the gears and the inner faces of the casing being only provided. For preventing rotative movement of the casing assemblage about the sleeve 6 any particular construction can be used such as the spider 31 shown in the drawing. The collar 32 of this spider encircles the axle housing and is secured thereto in any suitable manner, the outer ends of the spider legs being secured to the cover plate 2. It will be appreciated that through this construction the sleeve 6 may freely rotate in the casing assemblage upon the axle housing while such casing assemblage is held against rotation by the spider 31.

The assemblage of my braking device is as follows:

When it is desired to adapt my invention for automobile use one of my devices is substituted for each brake upon the car and as the devices are similar it is only necessary to describe the mounting of one. The brake drum is first removed from the automobile wheel and the plate 5 secured thereto in lieu thereof as before described. The wheel is then placed upon its side with the sleeve 6 standing up vertically. The casing 1 is now inserted over the sleeve, the packing nut 10 therein of course being slack and the cover plate 2 removed. The gear 12 is now positioned upon the sleeve 6 and the feather 14 for keying it to such sleeve fitted. The gear 13 is next dropped into position upon the spindle 15 and meshing with the gear 12. When the gears and valve 22 have been positioned in place oil is poured into the passage 21 and the gears given several rotations so that the passage and the spaces between the teeth of the gears are entirely filled with oil, the valve being set in the open position so that the orifice 23 extending therethrough is also completely filled with oil. It will be understood that while this operation is being performed that it will be necessary to keep the casing 1 in an absolute horizontal position so that the maximum quantity of oil is received therein. The cover plate 2 is now positioned in place upon the casing 1, the nuts 3 being threaded upon the studs 4 and thus firmly securing the cover plate in place, an oil-tight joint being constituted. It will of course be understood that the abutting faces of the casing 1 and the cover plate 2 will be accurately machined but if it is found that the oil has a tendency to leak between the machined joint a gasket made of sheet-lead or other material can be very readily used. The only other operation in the assembly of the device is to adjust the packing nuts 10 so that an oil-tight joint is constituted between the sleeve 6 and the casing yet permitting the sleeve to freely rotate therein.

The wheel is now placed in an upright position and ready for replacement upon the car, the band brake mechanism on the axle housing of course having been removed. When the wheel is being placed in position the collar 32 of the spider will first be inserted upon the axle housing, the axle housing then entering the sleeve 6, the wheel being secured to the car axle in the usual manner. When this has been done it is only necessary to secure the collar 32 of the spider 31 to the axle housing which of course can be done in many ways. The arms 27 upon the valve stem 25 is connected to the usual brake actuating mechanism of the automobile by any suitable means such as the connecting rod 28 which is flexibly connected at one end to the outer end of the arm 27.

The operation of my device is as follows:

When the car is in motion the plate 5 and sleeve 6 will be of course rotated by the running wheel to which such plate is attached and as the gear 12 is attached to the sleeve 6 it will also rotate, and in turn rotate the gear 13. These two rotating gears form a pump of the intermeshing gear type, the oil being carried around by the gears in the spaces constituted between the gear teeth and the faces of the segmental recess 20 and the inner face of the circular wall 18. If the gear 12 is rotated in an anti-clockwise direction the gear 13 will of course rotate in a clockwise direction and the oil be carried around as indicated by the dotted arrows in Figure 1. It will be understood that as the oil is pumped from one side of the gear mesh to the other that it will necessarily have to circulate around the passage 21 at a comparatively high speed when the car is in motion.

When the driver of the car desires to slow down or stop and applies the brake the application will actuate the connecting rod 28 which will of course swing the arm 27 and rotate the valve 22. If it is desired to bring the car to a dead stop the driver fully applies the brake which will give the arm 27 sufficient movement to entirely close the valve, the valve port 23 extending transversely across the passage. Immediately this is done the circulation of oil will be stopped, the further rotation of the gears tending to pump oil into an inclosed space. It will be appreciated that as oil is a practically non-compressible fluid that it will immediately exert a reactionary pressure against the teeth of the gears and as the movement of the gears is directly proportionate to the pressure exerted against them the oil pressure will be sufficient to almost instantaneously stop their revolution and thus bring the car to a standstill. If it is desired to merely retard the speed of the car the valve 22 is only partially closed thus admitting a certain passage of oil therethrough yet allowing a certain pressure of oil to be maintained which will reduce the speed of the oil pumping gears. It will of course be understood that it is necessary to construct my mechanism with as small clearances as possible so as to prevent any possibility of oil leak when the oil circulation control valve is completely closed but as the whole mechanism is at all times completely bathed in oil there is little possibility of it becoming overheated and consequently small clearances may be used with the greatest safety.

From the above description it will be apparent that I have devised an extremely simple and effective form of braking mechanism in which wear through friction is practically eliminated and which will require the very minimum of attention as the moving parts continuously run in oil thus making wear practically imperceptible.

My device can be used where any braking system is required but is especially adapted for automobile use where quick braking in conjunction with a compact and simple mechanism is particularly required. Furthermore by use of my device a quick and silent braking is achieved, the squeak which generally attends the application of friction brakes being entirely eliminated.

What I claim as my invention is:

A fluid brake for automobiles comprising a sleeve revolubly mounted upon an axle housing, a circular plate formed upon the outer end of the sleeve and adapted to be secured to the running wheel so that the sleeve rotates therewith, a gear adapted to be secured upon the sleeve, a fluid tight casing of substantially cylindrical form inclosing the gear and mounted upon the sleeve, said sleeve being rotatable within the casing, means for preventing the egress of fluid between the casing and the sleeve, a member of spider formation secured about the axle housing and having the ends of its arms secured to the casing to hold it against rotation, an idler pinion journaled within the casing and meshing with the first mentioned gear, a fluid conduit embodied within the casing through which the fluid circulates under the pumping influence of the rotative movement of the intermeshing gears, and a manually actuated valve in the fluid conduit for controlling the circulation of the fluid.

STANLEY EZEAKEL GRIFFITH.